(12) United States Patent
Furumiya et al.

(10) Patent No.: US 7,248,552 B2
(45) Date of Patent: Jul. 24, 2007

(54) METHOD AND APPARATUS FOR DETERMINING RECORDING PULSE PARAMETERS FOR AN OPTICAL DISC

(75) Inventors: Shigeru Furumiya, Himeji (JP); Junichi Minamino, Nara (JP); Mamoru Shoji, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 480 days.

(21) Appl. No.: 10/629,546

(22) Filed: Jul. 30, 2003

(65) Prior Publication Data

US 2004/0022151 A1   Feb. 5, 2004

Related U.S. Application Data

(62) Division of application No. 09/582,675, filed as application No. PCT/JP99/06158 on Nov. 5, 1999, now Pat. No. 6,791,926.

(30) Foreign Application Priority Data

Nov. 6, 1998   (JP) .................................. 10-315885

(51) Int. Cl.
  *G11B 5/58*   (2006.01)
  *G11B 7/00*   (2006.01)
(52) U.S. Cl. ............................... 369/53.13; 369/47.53; 369/59.11; 369/53.35
(58) Field of Classification Search ............. 369/47.53, 369/53.31, 13.26, 116, 53.26, 59.12, 13.27, 369/53.35, 59.11, 53.13
See application file for complete search history.

(56) References Cited

U.S. PATENT DOCUMENTS

| | | | | |
|---|---|---|---|---|
| 4,873,680 A | * | 10/1989 | Chung et al. ............. | 369/59.12 |
| 5,490,126 A | | 2/1996 | Furumiya et al. | |
| 5,513,165 A | * | 4/1996 | Ide et al. ................. | 369/116 |
| 5,617,399 A | * | 4/1997 | Spruit et al. ............. | 369/47.53 |
| 5,636,194 A | | 6/1997 | Furumiya et al. | |
| 5,974,021 A | * | 10/1999 | Toda et al. .............. | 369/116 |
| 6,310,846 B1 | * | 10/2001 | Fuji ........................ | 369/53.31 |
| 6,356,515 B1 | * | 3/2002 | Kumita et al. ........... | 369/13.26 |
| 6,411,575 B1 | | 6/2002 | Akiyama et al. | |
| 6,611,481 B1 | * | 8/2003 | Koishi et al. ............ | 369/47.53 |

FOREIGN PATENT DOCUMENTS

| | | |
|---|---|---|
| EP | 0469727 A1 | 2/1992 |
| EP | 0477892 A2 | 4/1992 |
| EP | 0557584 A1 | 9/1993 |
| EP | 851413 | 7/1998 |
| JP | 5-234079 | 9/1993 |
| JP | 5-279513 | 5/1995 |
| JP | 8-287465 | 11/1996 |
| JP | 9-81937 | 3/1997 |
| WO | 93/10527 | 5/1993 |

* cited by examiner

Primary Examiner—Hoa T. Nguyen
Assistant Examiner—Kim-Kwok Chu
(74) Attorney, Agent, or Firm—Wenderoth, Lind & Ponack, L.L.P.

(57) ABSTRACT

If data is recorded using a disc with deviating characteristics and a recorder with deviating characteristics, data will not be appropriately recorded, and errors will occur in the read signal. Standard recording pulse parameters specifying recording pulse positions for plural possible mark length and space length combinations are read from a writable optical disc, these standard recording pulse parameters are then used for test writing, the standard recording pulse parameters are changed uniformly or individually, a best recording pulse parameter is thus obtained, and jitter can be reduced.

4 Claims, 11 Drawing Sheets

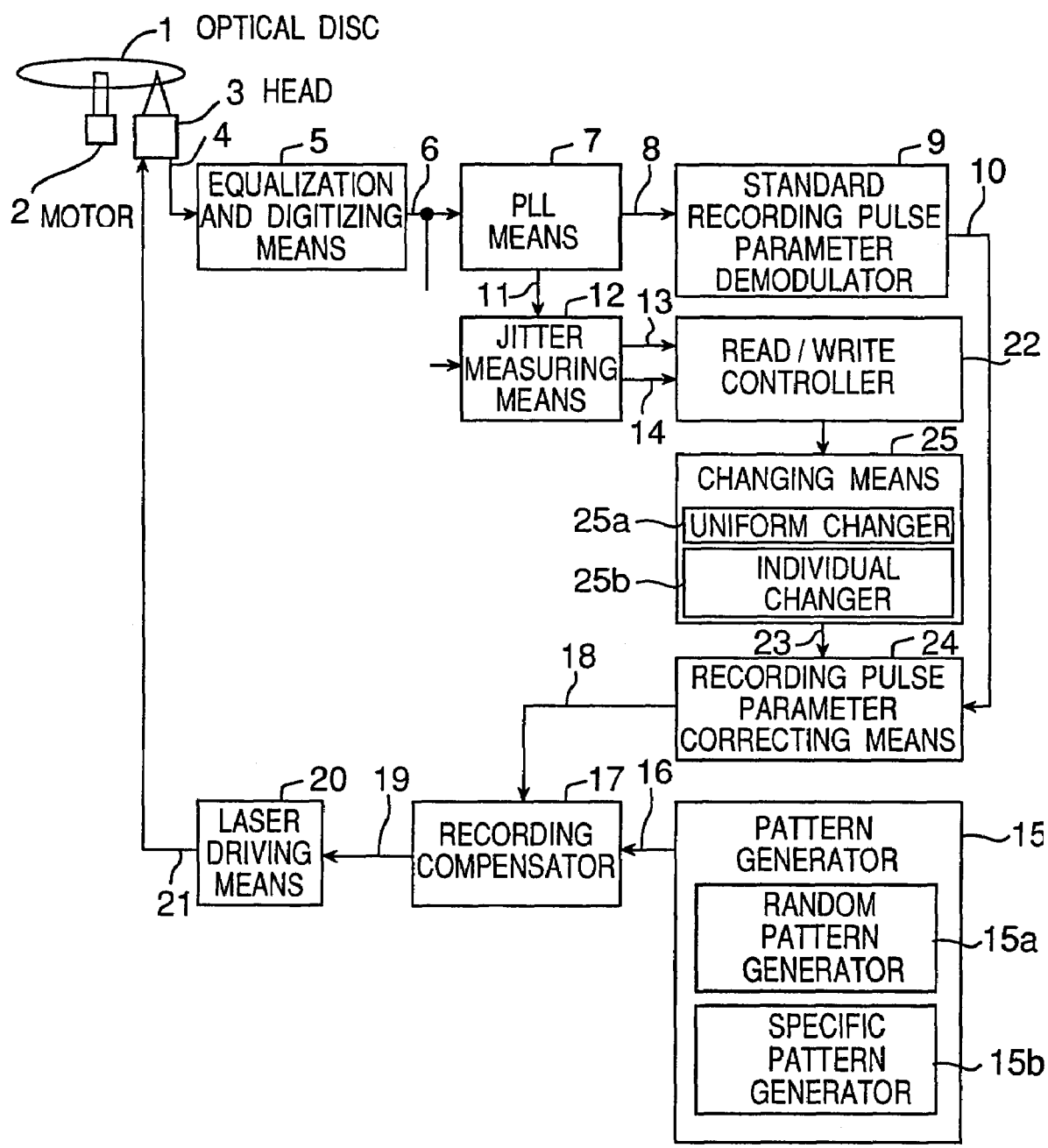

Fig.2A

PARTICULAR MARK LENGTH

PRECEDING SPACE LENGTH

|  | 5Tm OR GREATER | 4Tm | 3Tm |
|---|---|---|---|
| 5Ts OR GREATER | 5Ts5Tm | 5Ts4Tm | 5Ts3Tm |
| 4Ts | 4Ts5Tm | 4Ts4Tm | 4Ts3Tm |
| 3Ts | 3Ts5Tm | 3Ts4Tm | 3Ts3Tm |

Fig.2B

PARTICULAR MARK LENGTH

FOLLOWING SPACE LENGTH

|  | 5Tm OR GREATER | 4Tm | 3Tm |
|---|---|---|---|
| 5Ts OR GREATER | 5Tm5Ts | 4Tm5Ts | 3Tm5Ts |
| 4Ts | 5Tm4Ts | 4Tm4Ts | 3Tm4Ts |
| 3Ts | 5Tm3Ts | 4Tm3Ts | 3Tm3Ts |

Fig.5A

PRECEDING SPACE LENGTH × PARTICULAR MARK LENGTH

| | 5Tm OR GREATER | 4Tm | 3Tm |
|---|---|---|---|
| 5Ts OR GREATER | — | 5Ts4Tm +1 | 5Ts3Tm +1 |
| 4Ts | 4Ts5Tm +1 | 4Ts4Tm +1 | 4Ts3Tm +1 |
| 3Ts | 3Ts5Tm +1 | 3Ts4Tm +1 | 3Ts3Tm +1 |

Fig.5B

PRECEDING SPACE LENGTH × PARTICULAR MARK LENGTH

| | 5Tm OR GREATER | 4Tm | 3Tm |
|---|---|---|---|
| 5Ts OR GREATER | 5Ts5Tm ±0 | 5Ts4Tm ±0 | 5Ts3Tm ±0 |
| 4Ts | 4Ts5Tm ±0 | 4Ts4Tm ±0 | 4Ts3Tm ±0 |
| 3Ts | 3Ts5Tm ±0 | 3Ts4Tm ±0 | 3Ts3Tm ±0 |

Fig.5C

PRECEDING SPACE LENGTH × PARTICULAR MARK LENGTH

| | 5Tm OR GREATER | 4Tm | 3Tm |
|---|---|---|---|
| 5Ts OR GREATER | 5Ts5Tm -1 | 5Ts4Tm -1 | 5Ts3Tm -1 |
| 4Ts | 4Ts5Tm -1 | 4Ts4Tm -1 | 4Ts3Tm -1 |
| 3Ts | 3Ts5Tm -1 | 3Ts4Tm -1 | 3Ts3Tm -1 |

Fig.5D

FOLLOWING SPACE LENGTH × PARTICULAR MARK LENGTH

| | 5Tm OR GREATER | 4Tm | 3Tm |
|---|---|---|---|
| 5Ts OR GREATER | 5Tm5Ts -1 | 4Tm5Ts -1 | 3Tm5Ts -1 |
| 4Ts | 5Tm4Ts -1 | 4Tm4Ts -1 | 3Tm4Ts -1 |
| 3Ts | 5Tm3Ts -1 | 4Tm3Ts -1 | 3Tm3Ts -1 |

Fig.5E

FOLLOWING SPACE LENGTH × PARTICULAR MARK LENGTH

| | 5Tm OR GREATER | 4Tm | 3Tm |
|---|---|---|---|
| 5Ts OR GREATER | 5Tm5Ts ±0 | 4Tm5Ts ±0 | 3Tm5Ts ±0 |
| 4Ts | 5Tm4Ts ±0 | 4Tm4Ts ±0 | 3Tm4Ts ±0 |
| 3Ts | 5Tm3Ts ±0 | 4Tm3Ts ±0 | 3Tm3Ts ±0 |

Fig.5F

FOLLOWING SPACE LENGTH × PARTICULAR MARK LENGTH

| | 5Tm OR GREATER | 4Tm | 3Tm |
|---|---|---|---|
| 5Ts OR GREATER | 5Tm5Ts +1 | 4Tm5Ts +1 | 3Tm5Ts +1 |
| 4Ts | 5Tm4Ts +1 | 4Tm4Ts +1 | 3Tm4Ts +1 |
| 3Ts | 5Tm3Ts +1 | 4Tm3Ts +1 | 3Tm3Ts +1 |

Fig.6A

| PRECEDING SPACE LENGTH | PARTICULAR MARK LENGTH | | |
|---|---|---|---|
| | 5Tm OR GREATER | 4Tm | 3Tm |
| 5Ts OR GREATER | 3 | 5 | 7 |
| 4Ts | 2 | 4 | 6 |
| 3Ts | 1 | 3 | 5 |

Fig.6B

| PRECEDING SPACE LENGTH | PARTICULAR MARK LENGTH | | |
|---|---|---|---|
| | 5Tm OR GREATER | 4Tm | 3Tm |
| 5Ts OR GREATER | 2 | 4 | 6 |
| 4Ts | 1 | 3 | 5 |
| 3Ts | 0 | 2 | 4 |

Fig.6C

| PRECEDING SPACE LENGTH | PARTICULAR MARK LENGTH | | |
|---|---|---|---|
| | 5Tm OR GREATER | 4Tm | 3Tm |
| 5Ts OR GREATER | 1 | 3 | 5 |
| 4Ts | 0 | 2 | 4 |
| 3Ts | -1 | 1 | 3 |

Fig.6D

| FOLLOWING SPACE LENGTH | PARTICULAR MARK LENGTH | | |
|---|---|---|---|
| | 5Tm OR GREATER | 4Tm | 3Tm |
| 5Ts OR GREATER | -25 | -26 | -28 |
| 4Ts | -24 | -25 | -27 |
| 3Ts | -23 | -24 | -26 |

Fig.6E

| FOLLOWING SPACE LENGTH | PARTICULAR MARK LENGTH | | |
|---|---|---|---|
| | 5Tm OR GREATER | 4Tm | 3Tm |
| 5Ts OR GREATER | -24 | -25 | -27 |
| 4Ts | -23 | -24 | -26 |
| 3Ts | -22 | -23 | -25 |

Fig.6F

| FOLLOWING SPACE LENGTH | PARTICULAR MARK LENGTH | | |
|---|---|---|---|
| | 5Tm OR GREATER | 4Tm | 3Tm |
| 5Ts OR GREATER | -23 | -24 | -26 |
| 4Ts | -22 | -23 | -25 |
| 3Ts | -21 | -22 | -24 |

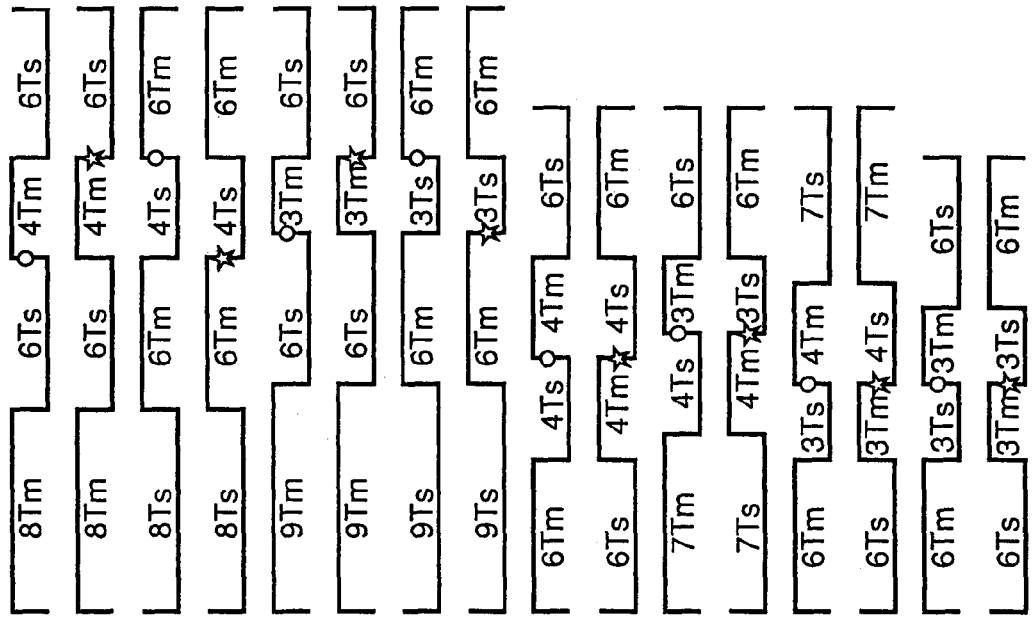

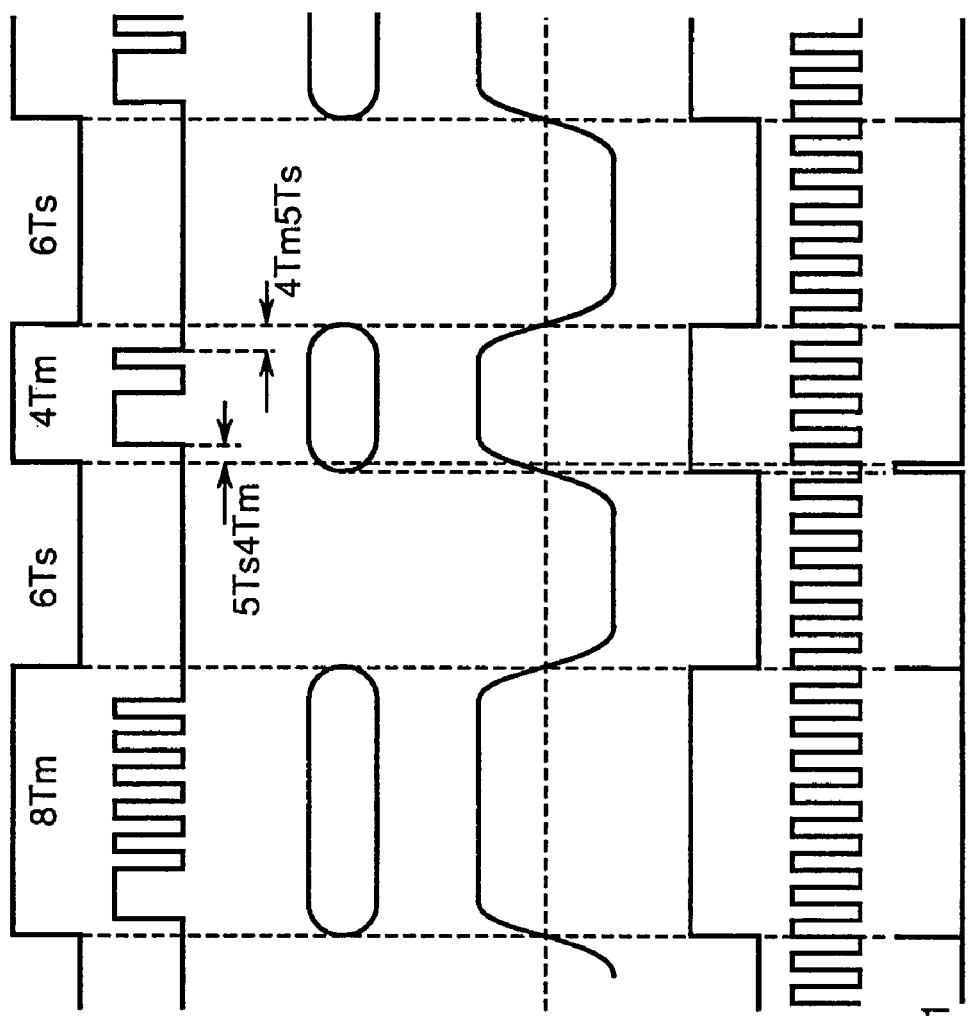

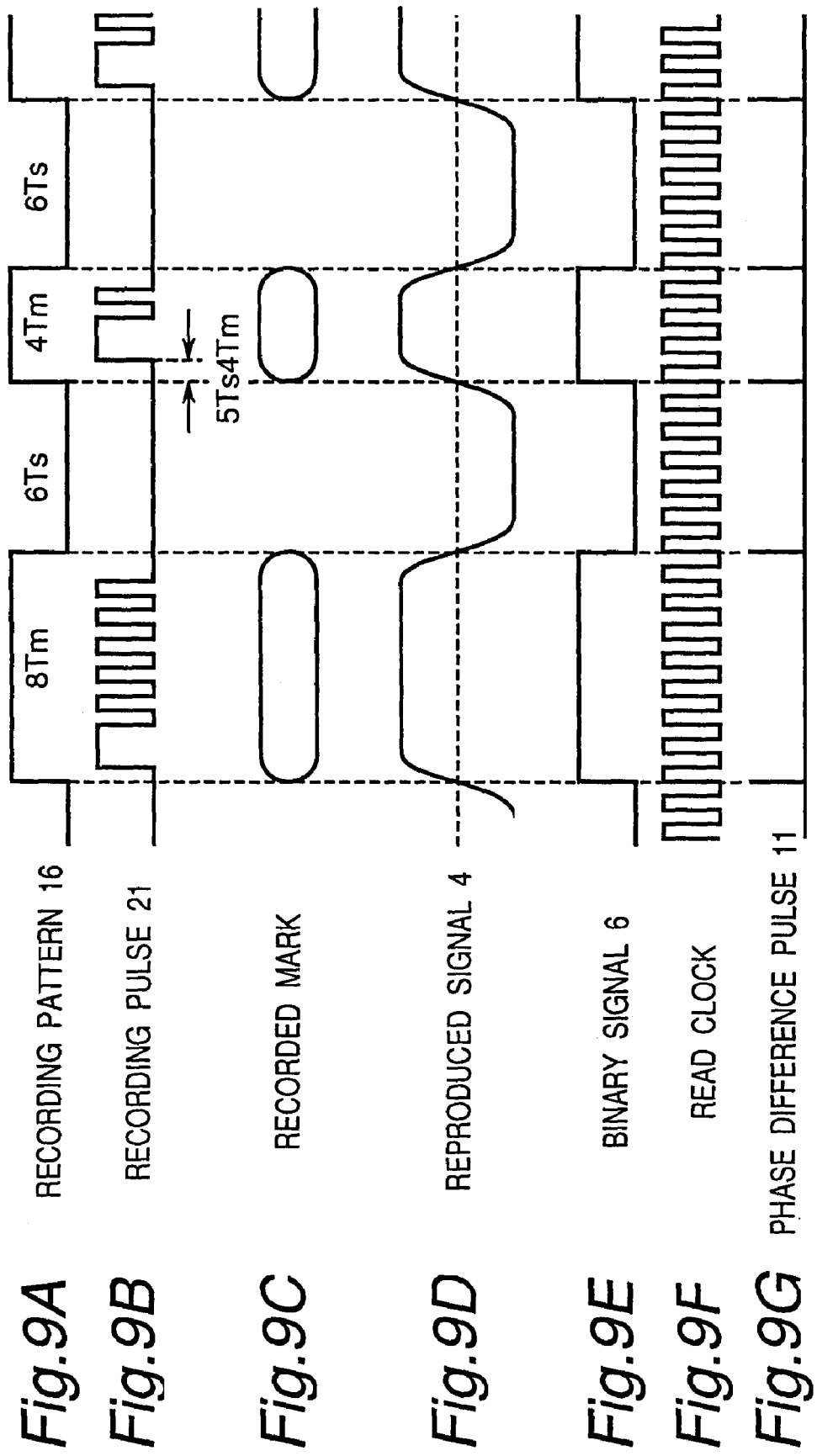

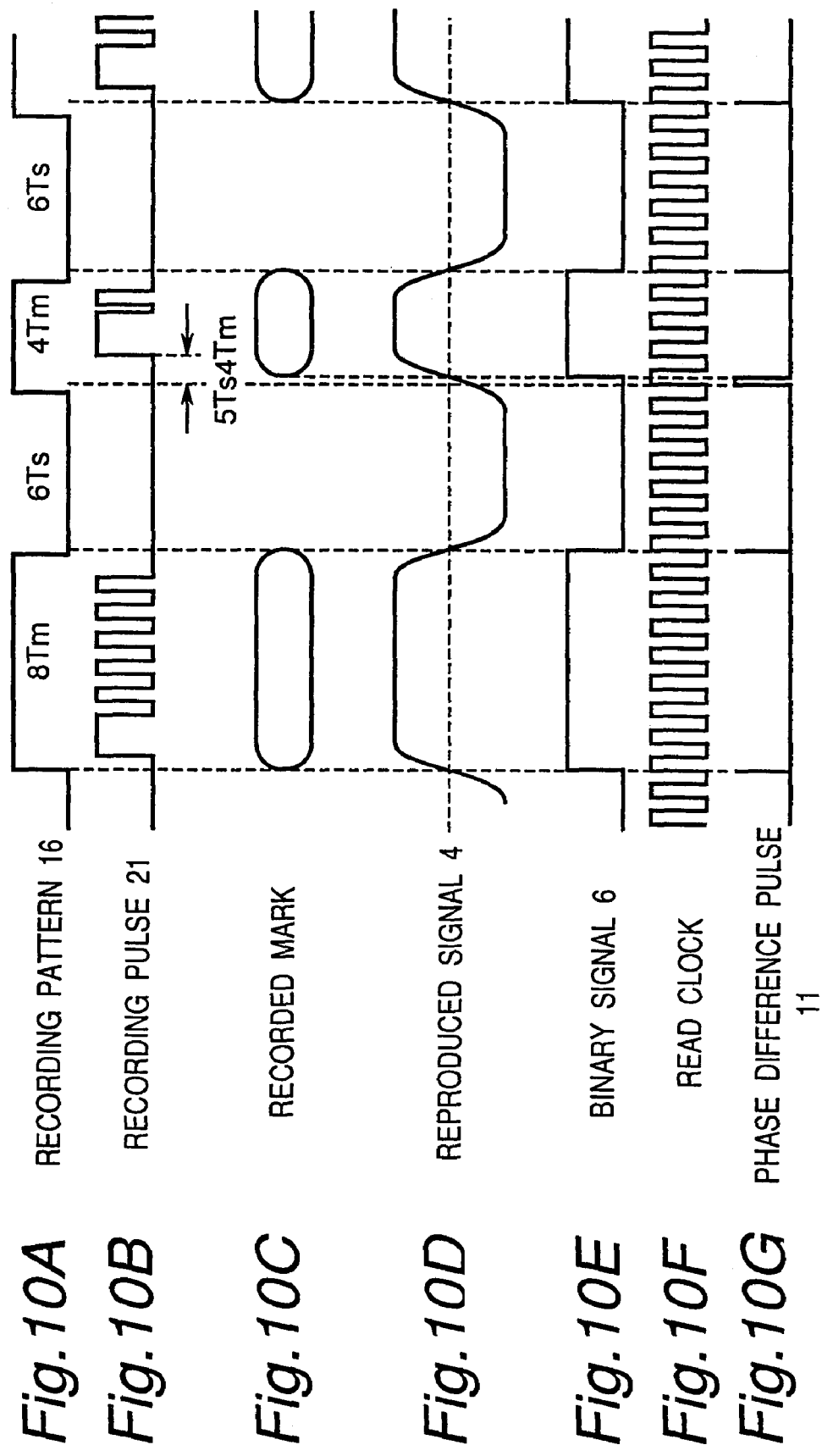

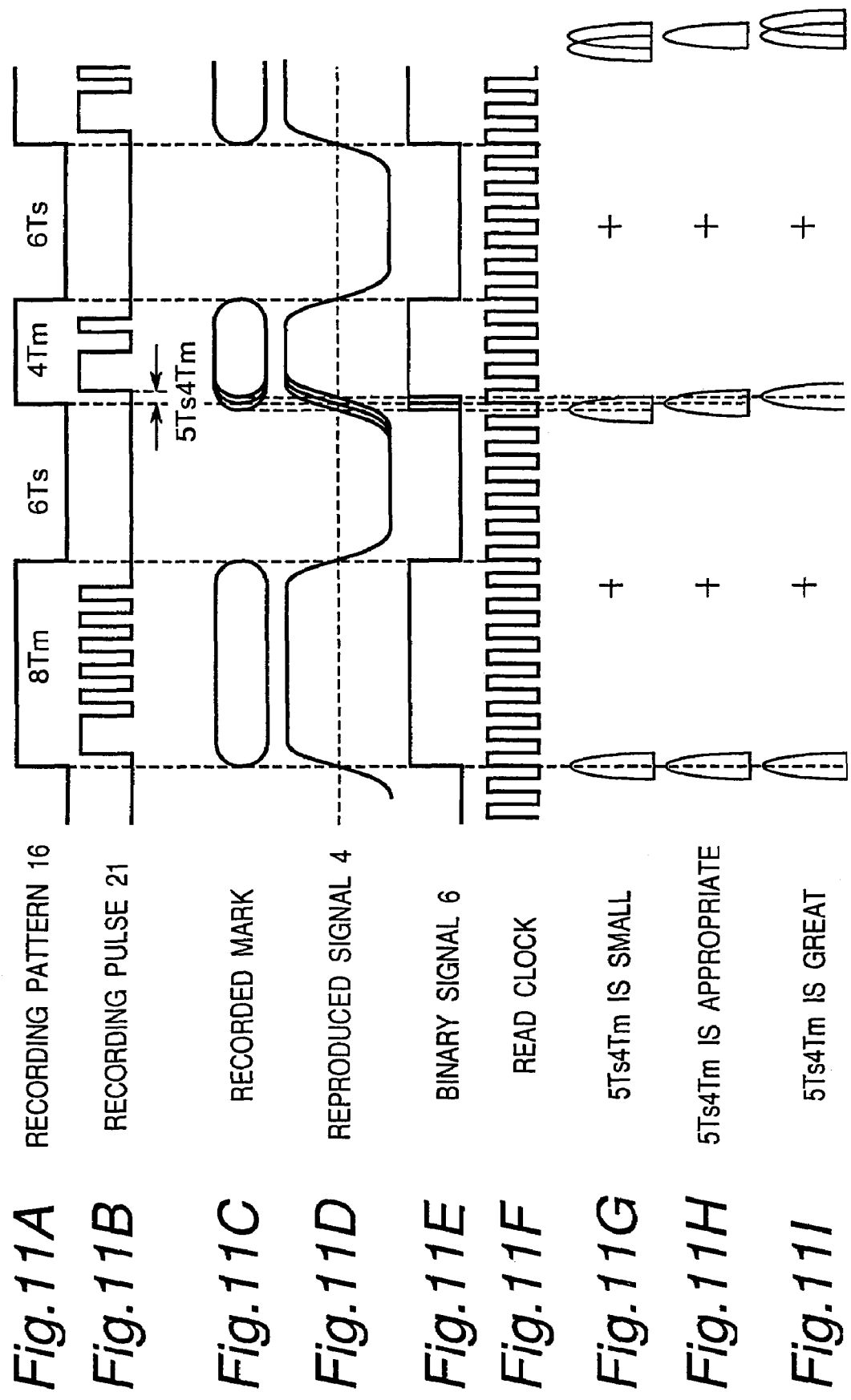

METHOD AND APPARATUS FOR DETERMINING RECORDING PULSE PARAMETERS FOR AN OPTICAL DISC

This is a divisional application of Ser. No. 09/582,675, filed Jun. 29, 2000, now U.S Pat. No. 6,791,926 which corresponds to International Application PCT/JP99/06158, filed Nov. 5, 1999.

TECHNICAL FIELD

The present invention relates to a method and apparatus for determining the recording pulse parameters of an optical disc by reading standard recording pulse parameters from a writable optical disc, the optical disc having standard recording pulse parameters prerecorded to a specific area thereof, setting the recording pulse parameters of a recording and reproducing device, and recording or reproducing data from the disc.

BACKGROUND ART

The DVD-RAM specification describes one example of a high data capacity rewritable optical disc, and devices capable of writing 2.6 gigabytes of data using a mark edge recording method to one side of a 12 cm diameter disc using a phase change recording film are available. Looking to achieve an even higher density optical disc medium, the present inventors have been studying a disc recording method (cf., JP2679596) capable of reducing shifting in the mark edge position as a result of heat interference between marks, a problem with high density recording in phase change optical disc media.

When this disc recording method records data to disc as amorphous marks using a mark edge recording technique, recording is accomplished using a laser beam of plural pulse streams, known as a multipulse beam. Because the size of the recorded marks and the distance of the space between marks is so small in high density recording, the heat of the laser light applied to form a particular mark is also transferred to the marks therebefore and thereafter, causing distortion in the shape of the particular mark and the marks therebefore and thereafter. To prevent this, marks are recorded by precompensating for heat interference between marks by changing the position of the first pulse in the multipulse stream used for pulse formation according to the relationship between the length of a particular mark and the length of the preceding space, and changing the position of the last pulse in the multipulse stream used for pulse formation according to the relationship between the length of the particular mark and the length of the following space. This control of recording pulse position is typically referred to as recording compensation. There are values in the recording pulse parameters (recording compensation parameters) that differ in specific mark and space combinations, resulting in tables such as shown in FIG. 2. The relationship between mark and space positions resulting from the values shown in the tables is shown in FIG. 3.

The recording pulse parameters for accomplishing recording compensation must be prestored to the optical disc or the disc recorder in order to achieve an actual optical disc recording and reproducing apparatus. Plural discs with different characteristics, that is, with different recording pulse parameters, can be used by recording these values to the disc so that the recording device can read the values when the disc is used.

DISCLOSURE OF INVENTION

Technical Problem to be Solved by the Invention

Due to environmental changes and variations in the characteristics of components used in mass-produced optical disc recording and reproducing devices, the individual devices will not necessarily have identical characteristics. Considering, for example, a head having the laser and a laser driving means used for recording, the pulse width will change due primarily to variation in the laser characteristics even if the same current waveform is supplied to the laser. Individual devices will also not necessarily produce the same emission waveform. A certain amount of variation also occurs in the characteristics of mass produced optical discs, and the same mark shape will not necessarily be achieved with each individual disc even if recorded with identical emission waveforms.

Therefore, a problem has been that if standard recording pulse parameters determined by a reference device having standard characteristics using a reference disc having standard characteristics are used as is with mass-produced discs and devices having characteristics that deviate from the standard characteristics, recording and reproduction will not be possible depending upon the particular combination, and quality defects occur.

Moreover, while the problem is small if the discs are manufactured under sufficient quality control and deviation from the standard characteristics is minimal, if the standard recording pulse parameters prerecorded to the disc differ greatly from actual disc performance, it will not be possible to achieve full performance from the disc even if the standard recording pulse parameters read by the device from the disc are faithfully reproduced.

The present invention solves the aforementioned problems and has as a first object to provide, in an optical disc recording parameter determining method that reads the above-noted standard recording pulse parameters from a writable optical disc having standard recording pulse parameters prerecorded to a specific area thereof, sets the recording pulse parameters of a recording and reproducing apparatus, and records and reproduces data, an optical disc recording parameter determining method whereby the effects of variation in the characteristics of a writable optical disc and recording and reproducing apparatus can be reduced.

Furthermore, a second object is to provide an optical disc recording parameter determining method whereby good recording characteristics can be achieved even when there is a difference between the optical disc characteristics and standard recording pulse parameters of a writable optical disc having standard recording pulse parameters prerecorded to a specific area thereof.

Furthermore, a third object is to provide an optical disc recording parameter determining method capable of reducing the number of read/write operations and shortening the required time compared with the optical disc recording parameter determining method achieving the above-noted second object.

Method of Resolving the Problem

To achieve the above-noted first object, in an optical disc recording parameter determining method for reading standard recording pulse parameters from a writable optical disc to which standard recording pulse parameters are prerecorded to a specific area, setting the recording pulse parameters of a recording and reproducing device, and recording and reproducing data: all plural leading mark-edge pulse parameters, which are determined according to a particular mark length and preceding space length combination, and all trailing mark-edge pulse parameters, which are determined according to a particular mark length and following space length combination, in the standard recording pulse parameters are uniformly shifted a specific time; and a value corrected from the standard parameters so that the read/write signal jitter is less than or equal to an allowed value is set as a recording pulse parameter of the recording and reproducing device for reading and writing data.

Furthermore, to achieve the above-noted second object, recording patterns are recorded corresponding to each of plural leading mark-edge pulse parameters defined by a preceding space length and particular mark length combination, and each of plural trailing mark-edge pulse parameters defined by a particular mark length and following space length combination in the standard recording pulse parameters; and the values individually correcting the standard parameters so that the read signal jitter is less than or equal to an allowed value are set as the recording pulse parameters of the recording and reproducing device and used for data reading and writing.

Furthermore, to achieve the above-noted third object, recording patterns are recorded for each of the plural leading mark-edge pulse parameters selected from among the standard recording pulse parameters and determined by a preceding space length and particular mark length combination, and each of the plural trailing mark-edge pulse parameters selected from among the standard recording pulse parameters and determined by a particular mark length and following space length combination, and the values individually correcting the standard parameters so that read signal jitter is less than or equal to an allowed value are set as the recording pulse parameters of the recording and reproducing device. For recording pulse parameters not selected, values interpolated from the correction values of the selected recording pulse parameters are set as the recording pulse parameters of the recording and reproducing device and used for data reading and writing.

A first aspect of the present invention is a method for obtaining a recording pulse parameter that is a method for reading standard recording pulse parameters from a writable optical disc to which are prerecorded standard recording pulse parameters defining recording pulse position information for each of plural possible mark length and space length combinations, correcting a standard recording pulse parameter, and obtaining a best recording pulse parameter, said method:

performing a first test write to the optical disc using position information for all mark length and space length combinations in the standard recording pulse parameters;

reproducing the first test write and detecting a first jitter from the reproduced signal;

adding a first specific amount of change uniformly to the position information for all mark length and space length combinations in the standard recording pulse parameters, and performing a second test write to the optical disc using the uniformly changed position information;

reproducing the second test write and detecting a second jitter from the reproduced signal; and comparing the first jitter and second jitter, and selecting the position information used for the test write with less jitter.

A second aspect of the present invention is the method of the first aspect of the invention for obtaining a recording pulse parameter, this method further:

adding a second specific amount of change uniformly to the position information for all mark length and space length combinations in the standard recording pulse parameters, and performing a third test write to the optical disc using the uniformly changed position information;

reproducing the third test write and detecting a third jitter from the reproduced signal; and comparing the first jitter, second jitter, and third jitter, and selecting the position information used for the test write with least jitter.

A third aspect of the present invention is a method for obtaining a recording pulse parameter that is a method for reading standard recording pulse parameters from a writable optical disc to which are prerecorded standard recording pulse parameters defining recording pulse position information for each of plural possible mark length and space length combinations, correcting a standard recording pulse parameter, and obtaining a best recording pulse parameter, said method:

performing a first test write to the optical disc using position information for any one combination selected from all mark length and space length combinations in the standard recording pulse parameters;

reproducing the first test write and detecting a first jitter from the reproduced signal;

adding a first specific amount of change to the position information for the above one combination selected from all mark length and space length combinations in the standard recording pulse parameters, and performing a second test write to the optical disc using the changed position information;

reproducing the second test write and detecting a second jitter from the reproduced signal; and comparing the first jitter and second jitter, and selecting the position information used for the test write with less jitter.

A fourth aspect of the present invention is the method of the third aspect for obtaining a recording pulse parameter, said method further:

adding a second specific amount of change to the position information for the above one combination selected from all mark length and space length combinations in the standard recording pulse parameters, and performing a third test write to the optical disc using the changed position information;

reproducing the third test write and detecting a third jitter from the reproduced signal; and comparing the first jitter, second jitter, and third jitter, and selecting the position information used for the test write with least jitter.

A fifth aspect of the present invention is the method of the third aspect for obtaining a recording pulse parameter wherein when there is first position information selected for any one combination, and second position information selected for a separate combination, position information intermediately between the two combinations is obtained by interpolation from the first position information and the second position information.

A sixth aspect of the present invention is an apparatus for obtaining a recording pulse parameter that is an apparatus for reading standard recording pulse parameters from a writable optical disc to which are prerecorded standard recording pulse parameters defining recording pulse position information for each of plural possible mark length and space length combinations, correcting a standard recording pulse parameter, and obtaining a best recording pulse parameter, said apparatus comprising:

a test writing means for performing a first test write to the optical disc using position information for all mark length and space length combinations in the standard recording pulse parameters, a jitter detection means for reproducing the first test write and detecting a first jitter from the reproduced signal, the test writing means adding a first specific amount of change uniformly to the position information for all mark length and space length combinations in the standard recording pulse parameters, and performing a second test write to the optical disc using the uniformly changed position information, and the jitter detection means reproducing the second test write and detecting a second jitter from the reproduced signal, and further comprising a selection means for comparing the first jitter and second jitter, and selecting the position information used for the test write with less jitter.

A seventh aspect of the present invention is the apparatus of the sixth aspect for obtaining a recording pulse parameter, wherein:

the test writing means further adds a second specific amount of change uniformly to the position information for all mark length and space length combinations in the standard recording pulse parameters, and performs a third test write to the optical disc using the uniformly changed position information;

the jitter detection means reproduces the third test write and detects a third jitter from the reproduced signal; and the selection means compares the first jitter, second jitter, and third jitter, and selects the position information used for the test write with least jitter.

An eighth aspect of the present invention is an apparatus for obtaining a recording pulse parameter that is an apparatus for reading standard recording pulse parameters from a writable optical disc to which are prerecorded standard recording pulse parameters defining recording pulse position information for each of plural possible mark length and space length combinations; correcting a standard recording pulse parameter, and obtaining a best recording pulse parameter, said apparatus comprising:

a test writing means for performing a first test write to the optical disc using position information for any one combination selected from all mark length and space length combinations in the standard recording pulse parameters, and a jitter detection means for reproducing the first test write and detecting a first jitter from the reproduced signal, the test writing means adding a first specific amount of change to the position information for the above one combination selected from all mark length and space length combinations in the standard recording pulse parameters, and performing a second test write to the optical disc using the changed position information, and the jitter detection means reproducing the second test write and detecting a second jitter from the reproduced signal, and further comprising a selection means for comparing the first jitter and second jitter, and selecting the position information used for the test write with less jitter.

A ninth aspect of the present invention is the apparatus of the eighth aspect for obtaining a recording pulse parameter, wherein:

the test writing means adds a second specific amount of change to the position information for the above one combination selected from all mark length and space length combinations in the standard recording pulse parameters, and performs a third test write to the optical disc using the changed position information;

the jitter detection means reproduces the third test write and detects a third jitter from the reproduced signal; and the selection means compares the first jitter, second jitter, and third jitter, and selects the position information used for the test write with least jitter.

A tenth aspect of the present invention is the apparatus of the eighth aspect for obtaining a recording pulse parameter wherein when there is first position information selected for any one combination, and second position information selected for a separate combination, position information intermediately between the two combinations is obtained by interpolation from the first position information and the second position information.

Beneficial Effects Compared With the Related Technology

As noted above, in an optical disc recording parameter determining method that reads standard recording pulse parameters from a writable optical disc having standard recording pulse parameters prerecorded to a specific area thereof, and sets the recording pulse parameters of the recording and reproducing device for reading and writing data, the optical disc recording parameter determining method according to the present invention can reduce the effects of variation in the characteristics of the writable optical disc and the recording and reproducing device. In addition, good recording characteristics can be achieved even if there is a difference between the optical disc characteristics and the standard recording pulse parameters of the optical disc to which standard recording pulse parameters are prerecorded to a specific area thereof. Therefore, the invention has the effect of improving yield in the mass production of optical discs and recording and reproducing devices, improving product quality, and reducing cost.

BRIEF DESCRIPTION OF DRAWINGS

FIG. 1 is a block diagram of an optical disc recording and reproducing apparatus according to a preferred embodiment of the present invention.

FIG. 2 is a table showing recording pulse parameters.

FIG. 5 shows uniform time shift tables in the first embodiment of the invention.

FIG. 6 shows tables of specific numeric values for uniform time shift.

FIG. 7 shows recording pattern waveforms in a second embodiment of the invention.

FIG. 8 is a waveform diagram showing a recording and reproducing operation in a second embodiment of the invention.

FIG. 9 is a waveform diagram showing a recording and reproducing operation in a second embodiment of the invention.

FIG. 10 is a waveform diagram showing a recording and reproducing operation in a second embodiment of the invention.

FIG. 11 is a waveform diagram showing a jitter measurement method.

BEST MODE FOR CARRYING OUT THE INVENTION

Three preferred embodiments of the present invention are described next below using an actual optical disc and recording and reproducing apparatus.

A recording method used in the present embodiment is described first. When data is written to an optical disc, the data is written to disc as mark and space length information using a multipulse mark-edge recording process. The modulation process combines an integer number of mark lengths from 3T to 14T (where T is the time of one clock period) and space lengths from 3T to 14T. It is further assumed in the present embodiment that mark shape distortion and mark-mark thermal interference occurs at the mark-space boundary area in combinations of marks of length 3T, 4T, and 5T or greater (referred to below as 3Tm, 4Tm, and 5Tm) and spaces of length 3T, 4T, and 5T or greater (referred to below as 3Ts, 4Ts, and 5Ts).

A single mark has contact with an adjacent space at two places, i.e., at the leading edge and the trailing edge of the mark. It is therefore possible to record marks of the correct length by means of recording compensation whereby the edge positions of the recording pulses used for recording are adjusted according to the mark and space combination. If combinations of 5Tm or greater and 5Ts or greater are treated as a single combination, there are 3×3 or 9 different leading mark-edge pulse parameters, and 3×3 or 9 different trailing mark-edge pulse parameters, each of which can set parameters with different values so that there are settings for a total of 18 parameters. FIG. 2 shows tables of leading mark-edge pulse parameters and trailing mark-edge pulse parameters. In table (A) of FIG. 2, for example, the top left entry 5Ts5Tm represents the parameter for a leading mark-edge pulse at the boundary is between a 5T or longer space and a 5T or longer mark following thereafter. In table (B) in FIG. 2, the top right entry 3Tm5Ts represents the parameter for a trailing mark-edge pulse at the boundary between a 3T mark and a 5T or longer space following thereafter.

Figure 3:
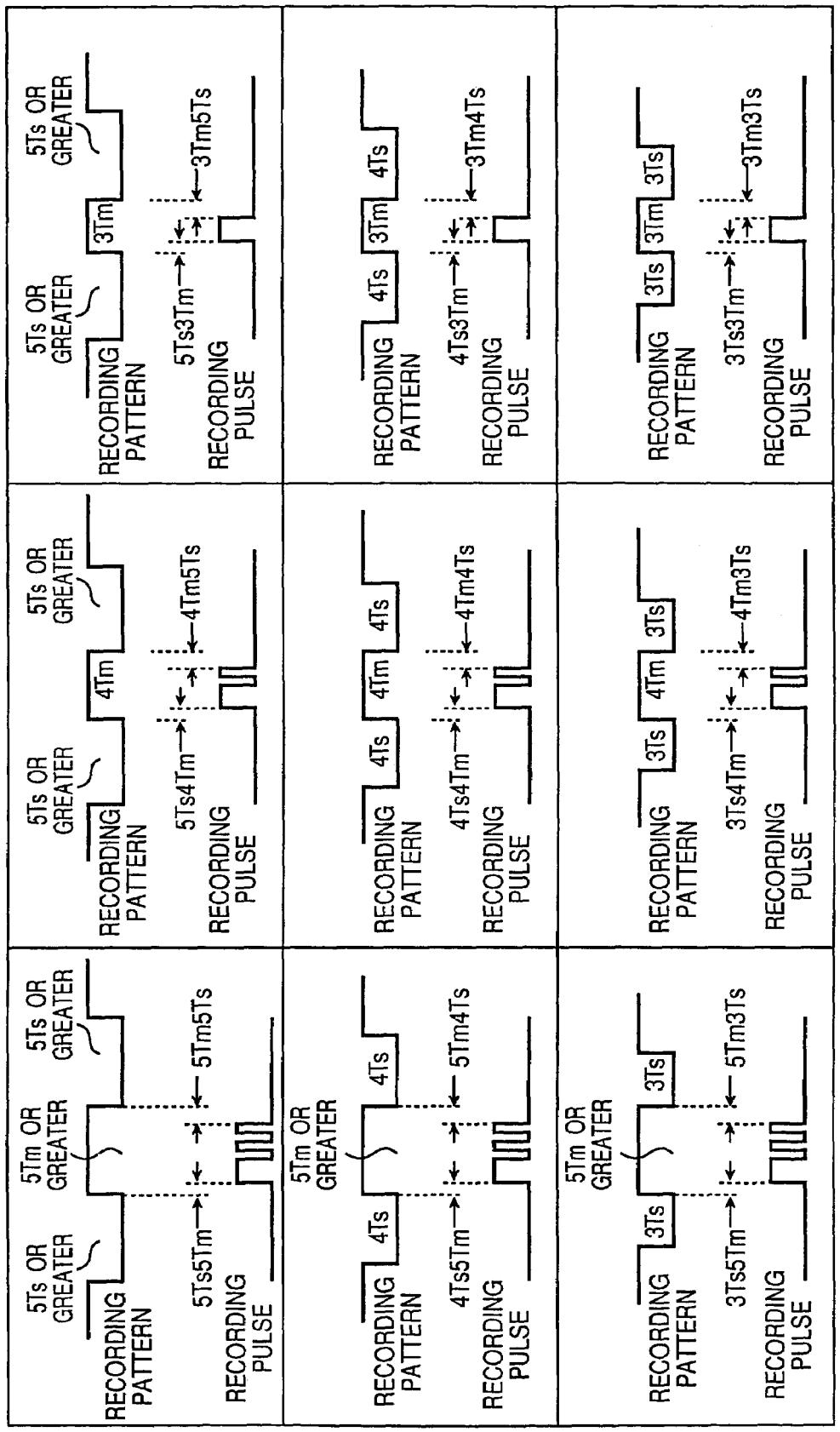
FIG. 3 is a descriptive illustration of recording pulse parameters.

As shown in FIG. 3, entries such as 5Ts5Tm (where Ts is first and Tm is next) in the FIG. 2 tables indicate the positional relationship between the leading edge of the recording pattern to be recorded to optical disc and the first pulse in the successive recording pulses for actually driving the laser, and entries such as 5Tm5Ts (where Tm is first and Ts is next) indicate the positional relationship between the trailing edge of the recording pattern to be recorded to optical disc and the last pulse in the successive recording pulses for actually driving the laser. In other words, FIG. 3 shows the relationship between recording pulses and the marks and spaces formed on disc based on these values.

For example, the leading mark-edge pulse parameter in FIG. 2 of 3Ts5Tm defines the parameters for forming a mark 5Tm or greater in length when the space immediately therebefore is 3Ts long. What this parameter means is that, as shown at the bottom left in FIG. 3, to record a 5T or longer mark after a 3T space, the leading edge position of the recording pulse is shifted the value of 3Ts5Tm from the leading edge (that is, the space-mark boundary) of the recording pattern.

The eighteen parameters shown in FIG. 2 are determined using a reference disc defining standard characteristics and a standard recording and reproducing device. The recording pulse parameters thus determined are pre-recorded to a specific area of the disc as standard recording pulse parameters. It should be noted that other items are also included in these standard recording pulse parameters, including, for example, the width of the first pulse, the middle pulses, and the last pulse in a recording pulse string, and the width of the cooling pulse appended after the last pulse. The present embodiments are, however, described below using by way of example pulse parameters that change appropriately according to the mark and space pattern combination being recorded.

Embodiment 1

FIG. 1 is a block diagram of an optical disc recording and reproducing device that implements the optical disc recording parameter determining method of the present invention. The components and signals of this device are described first. Reference numeral 1 is a writable phase-change type optical disc; reference numeral 2 is a motor for rotating the optical disc 1; reference numeral 3 is a head for reading recorded data from the rotating optical disc 1 and obtaining read signal 4; reference numeral 5 is an equalization and digitizing means for obtaining a digital binary signal 6 from the analog read signal by means of a duty feedback slice method after compensating the frequency characteristic of read signal 4; reference numeral 7 is a PLL for detecting the edge of binary signal 6, generating a read clock synchronized thereto, and converting the binary signal 6 to data 8 synchronized to the read clock, and outputting as phase difference pulse 11 the time-based offset between the edge of the read clock and the edge of binary signal 6; reference numeral 9 is a standard recording pulse parameter demodulator for detecting standard recording pulse parameters 10 from data 8; reference numeral 12 is a jitter measuring means for differentiating phase difference pulse 11 based on the high or low state of binary signal 6, converting the average pulse width to a voltage, and outputting leading mark-edge jitter voltage 13 and trailing mark-edge jitter voltage 14; reference numeral 22 is a read/write controller for storing past leading mark-edge jitter voltage 13 and trailing mark-edge jitter voltage 14 values, and outputting correction value 23 based on the magnitude of the values relative to a specific tolerance value; reference numeral 25 is a changing means for determining the change to be applied to the value of the standard recording pulse parameters 10, and outputting the change as correction value 23; reference numeral 24 is a recording pulse parameter correcting means for outputting as recording pulse parameter setting 18 a value obtained by adding correction value 23, that is, the change, to standard recording pulse parameters 10; reference numeral 15 is a pattern generator for generating the recording pattern used for determining the recording pulse parameter; reference numeral 17 is a recording compensator for converting recording pattern 16 to multipulse data 19 based on recording pulse parameter setting 18; and reference numeral 20 is a laser driving means for driving the laser mounted on head 3 with a specific current according to multipulse data 19.

The head 3 emits a laser beam with the current 21 supplied from laser driving means 20 to record to optical disc 1.

The jitter measuring means 12 measures as follows.

In FIG. 11 waveform (A) is the recording pattern generated by the pattern generating means 15, waveform (B) is the recording pulse generated by the laser driving means 20, waveform (C) shows the recording marks, waveform (D) is the read signal 4 obtained from head 3, waveform (E) is the binary signal obtained from equalization and digitizing means 5, waveform (F) is the read clock internally generated by the PLL 7. Waveforms (G), (H), and (I) show the jitter measurements for different cases. Because the leading edge of the binary signal and the edge of the read clock are synchronized at the point where the recording pattern corresponds to the leading edge of the 8Tm pulse in each of the waveforms (G), (H), and (I) in FIG. 11, jitter distribution centers on this point of edge-edge synchronization.

FIG. 11 shows jitter distribution when the leading edge of the binary signal is advanced (waveform (G)), synchronized (waveform (H)), and delayed (waveform (I)) relative to the read clock edge at the point where the recording pattern corresponds to the leading edge of the 4Tm pulse. When advanced, jitter distribution centers on the advanced edge of the binary signal. When synchronized, jitter distribution centers on the synchronized edge, and when delayed, jitter distribution centers on the delayed edge. This jitter distribution is shown accumulated on the time axis and superimposed at the right end of waveforms (G), (H), and (I). When the edges are mostly synchronized (waveform (H)), the width of the superimposed jitter distribution is narrow. When advanced (waveform (G)) or delayed (waveform (I)) edges are included, the width of the superimposed jitter distribution becomes wider.

The result of thus accumulating and superimposing the distribution of leading mark-edge jitter at a specific time interval is output as signal 13, and the result of accumulating and superimposing the distribution of trailing mark-edge jitter at a specific time interval is output as signal 14. These signals 13 and 14 indicate the degree of jitter, and are sent as the measured result to read/write controller 22.

The pattern generating means 15 contains a random pattern generator 15a for generating a random pattern, and a specific pattern generator 15b for generating a specific predetermined pattern. It should be noted that the random pattern generator 15a is used in the first preferred embodiment of the invention, and the specific pattern generator 15b is used in the second preferred embodiment of the invention.

The changing means 25 contains a uniform changer 25a for uniformly changing all nine default values in the standard recording pulse parameters, and an individual changer 25b for individually changing the nine default values.

The operating steps of the present embodiment are described next. The first step reads the standard recording pulse parameters prerecorded to the optical disc 1. To accomplish this, the head 3 moves the spot to a specific area on the rotating optical disc 1, and traces the track to which the standard recording pulse parameters are prerecorded. The read signal 4 at this time is converted by the equalization and digitizing means 5 to binary signal 6, and synchronized data 8 is obtained by PLL 7. The standard recording pulse parameters 10 are then extracted from data 8 by standard recording pulse parameter demodulator 9. A specific example of the standard recording pulse parameters 10 is shown in tables (B) and (E) of FIG. 6. Default values for all combinations at a leading mark-edge are set in table (B) as leading mark-edge pulse parameters, and default values for all combinations at a trailing mark-edge are set in table (E) as trailing mark-edge pulse parameters. Numeric values such as 2, 4, and 6 in the tables are in nanosecond units, and the recording clock period T is 17 nanoseconds.

The second step attempts writing data to the optical disc using the standard recording pulse parameters. To accomplish this, the laser spot of the head 3 is first moved to a writable track on the optical disc 1. The pattern generating means 15 generates a random signal 16 from the random pattern generator 15a as the recording pattern. The above-note standard recording pulse parameters 10 are applied directly as recording pulse parameter setting 18 without correction by the recording pulse parameter correcting means 24. The recording compensator 17 converts the random signal 16 to multipulse data 19 based on the recording pulse parameter setting. As shown in FIG. 8, for example, when a 6Ts4Tm (a 6T space and following 4T mark) signal is contained in the random signal 16, the leading edge of the recording pulse for the 4T mark is shifted +4 ns in the time base direction based on the values in table (B) of FIG. 6. As further shown in FIG. 8, when a 4Tm6Ts (a 4T mark and following 6T space) signal is contained in the random signal 16, the edge of the last recording pulse for the 4T mark is shifted −25 ns in the time base direction based on the values in table (B) of FIG. 6. This shifting of the first and last pulses can cause the entire pulse to shift or the leading edge of each pulse. The multipulse data 19 in which the first pulse and last pulse are thus shifted is converted in the laser driving means 20 to current 21 for driving the laser, and supplied to head 3. The head 3 then records to a writable track.

The third step reproduces the random data test written using the multipulse data 19 in which pulses were shifted based on the standard recording pulse parameters, and measures jitter in the reproduced signal. To accomplish this the track recorded in the second step is read by head 3, and equalization and digitizing means 5 obtains binary signal 6. The PLL 7 generates a read clock from binary signal 6, and outputs the phase difference pulse 11 of the read clock and binary signal. The jitter measuring means 12 separately detects the leading mark-edge jitter voltage 13 and trailing mark-edge jitter voltage 14. The detected results, that is, leading mark-edge jitter voltage Vf(0) and trailing mark-edge jitter voltage Vr(0), are stored to read/write controller 22. It should be noted that the 0 written here in parentheses indicates a standard parameter. If jitter voltages Vf(0) and Vr(0) are recorded, the changing means 25 is so informed and step 4 is then performed.

The fourth step uniformly changes standard recording pulse parameters 10 sent from, the standard recording pulse parameter demodulator 9 by means of the uniform changer 25a in the changing means 25, that is, time shifts and test writes the data to the optical disc. The standard recording pulse parameters are shown in tables (B) and (E) in FIG. 5, and examples of tables (B) and (E) being uniformly changed are shown in tables (A) and (D). The top and bottom middle tables (B) and (E) in FIG. 5 are the standard recording pulse parameters read from disc. The left table (A) shows correction values obtained by uniformly adding 1 to the values of the standard recording pulse parameters for the leading mark-edge pulse. The left table (D) shows correction values obtained by uniformly adding −1 to the standard recording pulse parameters for the trailing mark-edge pulse. The right table (C) likewise shows the correction values obtained by adding −1 uniformly to the standard recording pulse parameters of the leading mark-edge pulse, and the right table (F) shows the correction values obtained by adding 1 uniformly to the standard recording pulse parameters of the trailing mark-edge pulse. Examples of specific values substituted for the values shown in tables (A) to (F) of FIG. 5 are shown in tables (A) to (F) of FIG. 6.

It is here assumed that test writing to disc in the fourth step uses the correction values in table (A), that is, the standard leading edge parameter +1, and table (D), that is, the standard trailing edge parameter −1. The uniform changer 25a outputs a value of +1 for the leading mark-edge pulse parameter, and −1 as the trailing mark-edge pulse parameter, as the correction value 23. The correction values 23 are then applied to the standard recording pulse parameters 10 by the recording pulse parameter correcting means 24 to output recording pulse parameter settings 18. A random signal is then recorded to optical disc 1 as in the second step.

The fifth step reproduces the random data recorded in the fourth step, and measures jitter in the reproduced signal. As in the third step, leading mark-edge jitter voltage Vf(+1) and trailing mark-edge jitter voltage Vr(−1) are stored to read/write controller 22. Note that the values written in parentheses here indicate the change from the standard parameter.

Figure 4A:
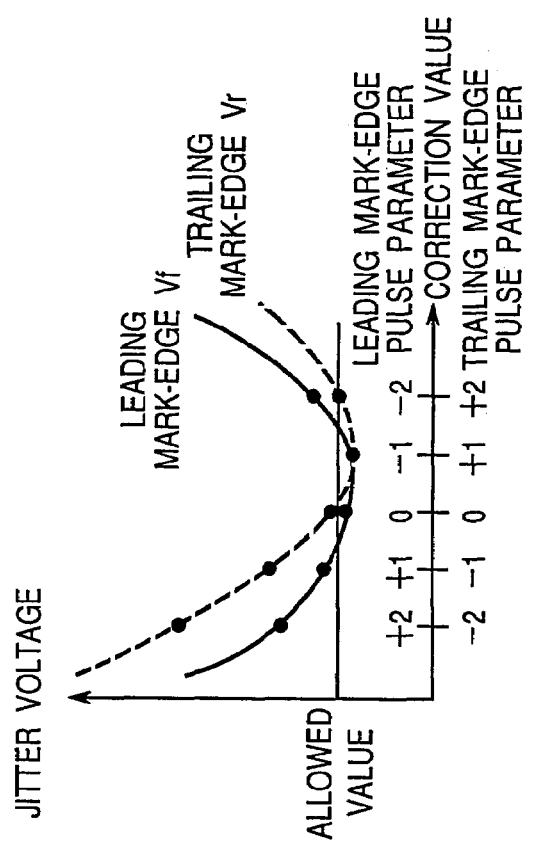
FIG. 4 is a characteristics graph showing jitter measurement results in a first embodiment of the invention.
Figure 4B:
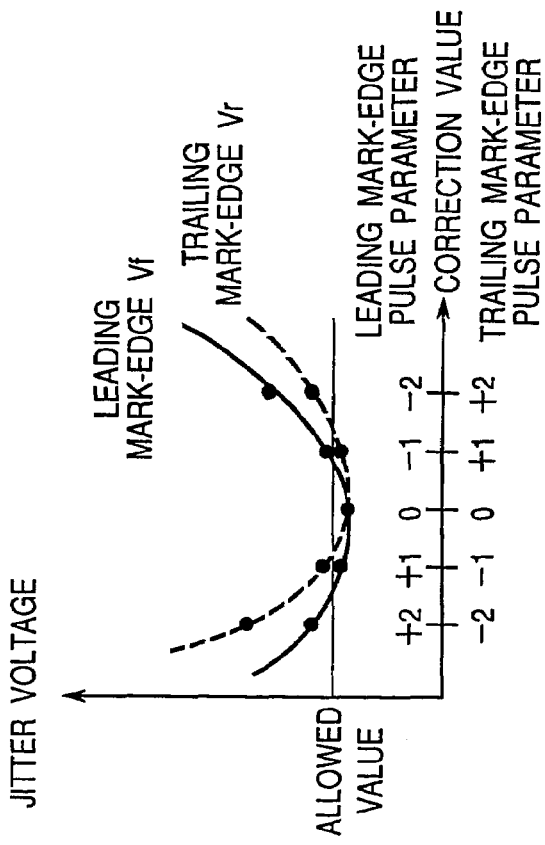

The fourth and fifth steps are then repeated while changing the correction value 23, and the jitter voltage values are collected. The correction values 23 for the leading mark-edge pulse parameter and trailing mark-edge pulse parameter change in pairs, such as (+1, −1), (+2, −2), (−1, +1), (−2, +2) as shown in FIG. 4. An example of the (+1, −1) change is shown in tables (A) and (D) of FIG. 5 with corresponding specific values shown in tables (A) and (D) of FIG. 6. In this preferred embodiment of the invention a change of +1 indicates a change of +1 nanosecond. Points plotted as shown in FIG. 4 by uniformly changing the standard recording pulse parameters using correction value 23 are recorded by read/write controller 22.

Two examples of jitter voltage Vf and Vr measurements obtained by uniformly changing the correction value 23 as described above: are shown in FIG. 4. The pair of leading mark-edge pulse parameters and trailing mark-edge pulse parameters where the jitter voltage is lowest or is less than or equal to the allowed value is used. If the characteristics of the optical disc that is used, the prerecorded standard recording pulse parameters, and the characteristics of the recording and reproducing device match, jitter voltage Vf at the leading mark-edge and jitter voltage Vr at the-trailing mark-edge will both be smallest or below the allowed value when the correction value is 0 as shown in FIG. 4 (A). On the other hand, if the characteristics of the optical disc that is used, the prerecorded standard recording pulse parameters, and the characteristics of the recording and reproducing device do not match, jitter voltage at the trailing mark-edge will exceed the allowed value when the correction value is 0, and will be smallest or below the allowed value when the correction value is not 0 as shown in FIG. 4 (B).

This embodiment of the present invention is a recording parameter determining method that focuses on uniformly correcting recording pulse parameters and the change in jitter in the reproduced signal, and is characterized by selecting from among the combinations of leading mark-edge jitter and trailing mark-edge jitter obtained by test writing under the various parameters the combination whereby the greater of the leading edge and trailing edge jitter values is smallest or less than or equal to the allowed value, and using the selected combination to set the optimum recording parameters for the recording and reproducing device.

The sixth step determines the recording pulse parameter settings used thereafter by the recording and reproducing device based on the jitter voltages collected in the fourth and fifth steps. The recording pulse parameter correcting means 24 in FIG. 1 selects from the set of leading mark-edge jitter voltages and trailing mark-edge jitter voltages for each correction value the correction value at which the greater of the leading edge and trailing edge jitter voltages is less than or equal to the allowed value, and uses the selected value thereafter as the recording parameters for the recording and reproducing device.

If less than or equal to is used as the condition for using a correction value, the pair where the leading mark-edge and trailing edge pulse parameter correction values are (−1, +1) can be used, or the pair where the leading mark-edge and edge trailing pulse parameter correction values are (0, +1) can be used.

The selected correction values are used for recording to the optical disc currently loaded in the recording and reproducing device.

Through the above steps, this embodiment of the present invention reads standard recording pulse parameters prerecorded to optical disc; from among these standard recording pulse parameters uniformly shifts all plural leading mark-edge pulse parameters, which are determined according to a particular mark length and preceding space length combination, and all trailing mark-edge pulse parameters, which are determined according to the particular mark length and following space length combination, a specific amount along the time base; selects and sets as the recording pulse parameters of the recording and reproducing device the value corrected from the standard parameters so that the read/write signal jitter is less than or equal to an allowed value; and reads and writes data using this set value. It is therefore possible by means of the present invention to reduce the effects of variation in the characteristics of a writable optical disc and recording and reproducing device, and constantly achieve the best optical disc recording and reproducing conditions.

It should be noted that the present embodiment was described as a method in which the trailing mark-edge pulse parameter is adjusted −1 when the leading mark-edge pulse parameter is adjusted +1 as correction values 23, but the invention shall not be limited to these numeric values. There are various combinations whereby the leading edge and trailing edge parameters can be uniformly corrected, and the effect of the present invention minimizing jitter can be achieved even with other correction values.

Embodiment 2

Described next below is a specific optical disc recording parameter determining method whereby good recording characteristics can be achieved with a writable optical disc wherein standard recording pulse parameters are recorded to a specific disc area even when there is a difference between the optical disc characteristics and standard recording pulse parameters. This second embodiment of the invention is also described with reference to FIG. 1. Those parts that differ from the above first embodiment are described below while further description of the same parts is omitted. In this embodiment two of the eighteen recording pulse parameters, that is, 5Ts5Tm and 5Tm5Ts, use the standard recording pulse parameters as is. Twelve different corresponding recording patterns are used to determine the remaining sixteen recording pulse parameters. These twelve recording patterns are generated by the specific pattern generator 15b of the pattern generating means 15.

The relationship between the recording pulse parameters and the recording pattern used is shown in FIG. 7.

Recording pattern (1) shown in FIG. 7 (A), for example, is used to determine the leading mark-edge pulse parameter 5Ts4Tm for forming a 4Tm mark after a preceding space of 5Ts or greater. Recording pattern (1) is a repeated signal of 8Tm, 6Ts, 4Tm, 6Ts.

All of the recording patterns are characterized by the total mark length and total space length being equal, containing two marks and two spaces, changing the edge to be determined, and using the other three edges fixed. In FIG. 7 the leading mark-edge to be changed is indicated with a circle (o), and the trailing mark-edge to be changed is indicated with a star (*). All others are fixed edges.

The operating steps of the present embodiment are described below. An example using recording pattern (1) to determine the leading mark-edge pulse parameter 5Ts4Tm for forming a 4T mark after a preceding space of 5Ts or greater is described in detail below by way of example, but it should be noted that the steps for determining other recording pulse parameters are identical except for using a different recording pattern.

In the first step the standard recording pulse parameters prerecorded to optical disc 1 are read. This step is the same as in the first embodiment.

The second step test writes the specific recording pattern (1) for determining the recording pulse parameter 5Ts4Tm to optical disc. The standard recording pulse parameter for 5Ts4Tm is output directly as recording pulse parameter setting 18, and recording pattern (1) is converted by recording compensator 17 based on the recording pulse parameter setting to multipulse data 19. The multipulse data 19 is converted by laser driving means 20 to current 21 for driving the laser, and supplied to head 3. The head 3 then records to a writable track.

The third step reproduces the test written recording pattern (1) and measures jitter in the reproduced signal. To accomplish this the track recorded in the second step is read by head 3, and equalization and digitizing means 5 obtains binary signal 6. The PLL 7 generates a read clock from binary signal 6, and outputs the phase difference pulse 11 of the read clock and binary signal. The jitter measuring means 12 outputs signal 13 indicating the leading mark-edge jitter voltage Vf(0) using the average width of the phase difference pulse 11 as the jitter voltage. Note that the 0 written in parentheses here indicates that the change in the recording pulse with respect to the edge to be changed in recording pulse (1) is 0, that is, that the jitter voltage was obtained as a result of directly using the default value 4 from the standard recording pulse parameters 10 (the value corresponding to 5Ts4Tm in table (B) of FIG. 6). It should be noted that because this step obtains the leading mark-edge pulse parameter, only leading mark-edge jitter voltage Vf is detected. Conversely, when the trailing mark-edge pulse parameter is obtained, only the trailing mark-edge jitter voltage Vr is detected. The detected leading mark-edge jitter voltage Vf(0) is then stored to read/write controller 22. If jitter voltage Vf(0) is recorded, the changing means 25 is so informed and step 4 is then performed.

In the fourth step the individual changer 25b of the changing means 25 outputs +1, for example, as the correction value 23 for the default value 4 of leading mark-edge pulse parameter 5Ts4Tm. The recording pulse parameter correcting means 24 outputs value 5, that is, the correction value 23 +1 added to the default value 4 of the 5Ts4Tm contained in the standard recording pulse parameters 10, as recording pulse parameter setting 18. Recording pattern (1) is then written to optical disc 1 as in the second step.

The fifth step reproduces the recording pattern (1) recorded in the fourth step, and measures jitter in the reproduced signal. As in the third step, leading mark-edge jitter voltage Vf(1) is stored to read/write controller 22. Moreover, steps four and five are repeated while changing the correction value 23, and the jitter voltages are collected.

The read/write waveforms obtained when the correction value 23 for recording pulse parameter 5Ts4Tm is changed to +1, +2, and +3 using recording pattern (1) are shown in FIG. 8, FIG. 9, and FIG. 10, respectively.

In FIG. 8 (B), 5Ts4Tm is corrected +1. When the recording pattern is recorded using this parameter, the leading edge of the recorded 4T mark is shifted to the left of the ideal position as shown in FIG. 8 (C). The phase difference pulse (FIG. 8 (G)) indicating the phase shift between the read clock (FIG. 8 (F)) and the binary signal (FIG. 8 (E)) digitizing the reproduced signal (FIG. 8 (D)) is therefore wider at the leading edge part of the 4T mark. The jitter voltage Vf(+1) indicating the average phase difference pulse width is therefore high.

In FIG. 9 (B), 5Ts4Tm is corrected +2. When the recording pattern is recorded using this parameter, the leading edge of the recorded 4T mark is at the ideal position as shown in FIG. 9 (C). As a result, all phase difference pulses (FIG. 9 (G)) indicating the phase shift between the read clock (FIG. 9 (F)) and the binary signal (FIG. 9 (E)) digitizing the reproduced signal (FIG. 9 (D)) are narrow. The jitter voltage Vf(+2) indicating the average phase difference pulse width is therefore low.

Furthermore, 5Ts4Tm is corrected +3 in FIG. 10 (B). When the recording pattern is recorded using this parameter, the leading edge of the recorded 4T mark is shifted to the right from the ideal position as shown in FIG. 10 (C). The phase difference pulse (FIG. 10 (G)) indicating the phase shift between the read clock (FIG. 10 (F)) and the binary signal (FIG. 10 (E)) digitizing the reproduced signal (FIG. 10 (D)) is therefore wider at the leading edge part of the 4T mark. The jitter voltage Vf(+3) indicating the average phase difference pulse width is therefore high.

This embodiment of the present invention is a recording parameter determining method that focuses on correction of the recording pulse parameters and change in the reproduced jitter voltage, and is characterized by using as the best recording parameter of the device the correction value whereby the leading mark-edge jitter obtained by test writing under the different parameters is less than or equal to an allowed value.

The sixth step sets the recording pulse parameter 5Ts4Tm used thereafter by the recording and reproducing device based on the jitter voltages Vf collected in steps four and five. That is, the case in which the jitter voltage Vf is lowest or less than or equal to the allowed value is obtained from the plural test writing and reading operations, and the correction value from that case is used. Using the cases shown in FIG. 8, FIG. 9, and FIG. 10 by way of example, a correction value of +2 for the leading mark-edge pulse parameter 5Ts4Tm is used. The read/write controller 22 in FIG. 1 thus selects the correction value at which the leading mark-edge jitter voltage is lowest or is less than or equal to the allowed value, and thereafter uses the selected correction value as the value of the recording and reproducing device for leading mark-edge pulse parameter 5Ts4Tm.

Test writing using recording pattern (1) is then performed in the same way to determine trailing mark-edge pulse parameter 4Tm5Ts, the correction value at which the trailing mark-edge jitter voltage Vr is less than or equal to the allowed value or is lowest is selected, and the selected correction value is thereafter used by the recording and reproducing device as the value for trailing mark-edge pulse parameter 4Tm5Ts. Next, test writing using recording pattern (2) is performed to determine the leading mark-edge pulse parameter 4Ts5Tm, the correction value whereby the leading mark-edge jitter voltage Vf is less than or equal to the allowed value or is lowest is selected, and the selected correction value is used thereafter by the recording and reproducing device as the value for leading mark-edge pulse parameter 4Ts5Tm. Steps two to six are thus repeated while changing the recording pattern.

Through the above steps, this embodiment of the present invention reads standard recording pulse parameters prerecorded to an optical disc; records recording patterns (FIG. 7 (A) to (P)) corresponding to each of plural leading mark-edge pulse parameters defined by a preceding space length and particular mark length combination, and each of plural trailing mark-edge pulse parameters defined by a particular mark length and following space length combination, these parameters being a part of the standard recording pulse parameters; and sets as the recording pulse parameters of the recording and reproducing device for data reading and writing the values individually correcting the standard parameters so that the read signal jitter is less than or equal to an allowed value or is lowest.

It is therefore possible by means of this method to constantly achieve the best optical disc reading and writing state even when there is a difference between the characteristics of the writable optical disc and the standard recording pulse parameters because the individual values of the recording pulse parameters can be corrected to a best value for the particular combination of optical disc and recording and reproducing device used.

Embodiment 3

Next is described a specific method for reducing the number of read/write operations and shortening time required when compared with the steps of the second embodiment.

When the leading mark-edge pulse parameter is 5Ts3Tm in FIG. 2, the correction value is determined as described in the above-noted second embodiment using recording pattern (3) in FIG. 7. When the leading mark-edge pulse parameter is 3Ts3Tm in FIG. 2, the correction value is determined using recording pattern (11) in FIG. 7. Then, when the leading mark-edge pulse parameter is 4Ts3Tm, the correction value is not determined using recording pattern (7), but rather is calculated by, for example, interpolating the 4Ts3Tm correction value from the relationship between the 5Ts3Tm correction value as determined above, the 5Ts3Tm value of the standard parameters, the 3Ts3Tm correction value as determined above, the 3Ts3Tm value of the standard parameters, and the 4Ts3Tm value of the standard parameters. Because the operation for determining the 4Ts3Tm correction value is an electrical computation, the time required is significantly less when compared with actually writing and reading recording pattern (7).

In other words, this embodiment of the present invention is characterized by not determining all recording pulse parameters by recording and reproducing corresponding recording patterns, and interpolating some of the parameters by calculation from other parameters.

As a result, the optical disc recording and reproducing device shown in FIG. 1 records recording patterns for each of the plural leading mark-edge pulse parameters selected from among the standard recording pulse parameters and determined by a preceding space length and particular mark length combination, and each of the plural trailing mark-edge pulse parameters selected from among the standard recording pulse parameters and determined by a particular mark length and following space length combination, and sets as the recording pulse parameters of the recording and reproducing device the values individually correcting the standard parameters so that read signal jitter is less than or equal to an allowed value (part of this process being the same as the steps of the second embodiment of the invention).

For recording pulse parameters not selected, the read/write controller 22 sets the values obtained by interpolation from the correction values of selected recording pulse parameters as the recording pulse parameter of the recording and reproducing device, and uses this interpolated value for data reading and writing. As a result, the time required to determine and set all of the recording pulse parameters can be significantly shortened.

It should be noted that this embodiment of the invention has been describing using the standard recording pulse parameters read from optical disc directly as the 5Ts5Tm and 5Tm5Ts recording pulse parameters, but the invention shall not be so limited. For example, the recording parameter determining method of the present invention can be applied after correction by a method such as recording a repeated 6Tm6Ts signal and detecting asymmetry or duty. Moreover, while the patterns shown in FIG. 7 are used as the recording patterns, jitter detection is possible insofar as the pattern contains an at least one edge of an attribute to be determined, contains two marks and two spaces, and the total length of marks and the total length of spaces in the pattern are the same.

The first and second embodiments of the invention have been described using a recording waveform with only two power levels, but the same effect can be achieved using multiple power levels. In addition, while the embodiments have been described with 3×3×2=18 recording pulse parameters, the invention can also be achieved if the number of parameters is increased to, for example, 4×4×2 parameters. In this case, however, the number of recording patterns used in the second embodiment above must be increased according to the number of parameters.

The invention claimed is:

1. A method for obtaining a recording pulse parameter by reading recording pulse parameters from a writable optical disc to which are prerecorded recording pulse parameters defining recording pulse position information defining either one of a leading mark-edge pulse parameter and a trailing mark-edge pulse parameter for each of plural possible mark length and space length combinations, said method comprising:

performing a first test write to the optical disc using the recording pulse position information for one combination selected from all mark length and space length combinations in the recording pulse parameters;

reproducing the first test write and detecting a first jitter from the reproduced signal;

adding a first specific amount of change to the recording pulse position information to change either one of the leading mark-edge pulse parameter and the trailing mark-edge pulse Parameter for the one combination selected from all mark length and space length combinations, and performing a second test write to the optical disc using the changed recording pulse position information;

reproducing the second test write and detecting a second jitter from the reproduced signal; and comparing the first jitter and second jitter, and selecting the recording pulse position information used for the test write with less jitter, wherein when one recording pulse position information is selected for one combination selected from all mark length and space length combinations, and another recording pulse position information is selected for another combination selected from all mark length and space length combinations, an intermediate recording pulse position information for a combination between said one and another combinations is obtained by interpolation from the one recording pulse position information and the another recording pulse position information.

2. An apparatus for obtaining a recording pulse parameter by reading recording pulse parameters from a writable optical disc to which are prerecorded recording pulse parameters defining recording pulse position information defining either one of a leading mark-edge pulse parameter and a trailing mark-edge pulse parameter for each of plural possible mark length and space length combinations, said apparatus comprising:

a storing device operable to store the recording pulse information;

a test writing device operable to perform a test write to the optical disc using the recording pulse position information stored in said storing device;

a jitter detector operable to reproduce the test write and to detect a jitter from the reproduced signal;

a correction device operable to add a specific amount of change to the recording pulse position information to change either one of the leading mark-edge pulse parameter and the trailing mark-edge pulse parameter for one combination selected from all mark length and space length combinations stored in said storing device so as to change the recording pulse position information;

a controller operable to control said test write device and said jitter detector to repeat the test write and the jitter detection when the recording pulse position information is changed to obtain pulse jitters; and a selection device operable to compare the jitters, and to select the recording pulse position information used for the test write with less jitter, wherein when one recording pulse position information is selected for one combination selected from all mark length and space length combinations, and another recording pulse position information is selected for another combination selected from all mark length and space length combinations, an intermediate recording pulse position information for a combination between said one and another combinations is obtained by interpolation from the one recording pulse position information and the another recording pulse position information.

3. A method for determining a recording pulse parameter for an optical disc having prerecorded recording pulse parameters defining recording pulse position information defining either one of a leading mark-edge pulse parameter and a trailing mark-edge pulse parameter for each of a plurality of mark length and space length combinations, said method comprising:

performing a first test write to the optical disk using the prerecorded recording pulse parameter for a first mark length and space length combination reproducing the first test write and detecting a first jitter from the reproduced first test write;

adding a first correction value to the prerecorded recording pulse parameter to change either one of the leading mark-edge pulse parameter and the trailing mark-edge pulse parameter to form a second recording pulse parameter and performing a second test write to the optical disc using the second recording pulse parameter;

reproducing the second test write and detecting a second jitter from the reproduced second test write;

comparing the first jitter with the second jitter;

selecting either the prerecorded recording pulse parameter or the second recording pulse parameter for the first mark length and space length combination based on the comparison of the first jitter with the second jitter;

wherein when one recording pulse parameter is selected for one mark length and space length combination and another recording pulse parameter is selected for another mark length and space length combination, an intermediate recording pulse parameter for a combination between the one and another combinations is obtained by interpolation from said one and another recording pulse parameters.

4. An apparatus for determining a recording pulse parameter for a writable optical disc to which are prerecorded recording pulse parameters defining recording pulse position information defining either one of a leading mark-edge pulse parameter and a trailing mark-edge pulse parameter for each of a plurality of mark length and space length combinations, said apparatus comprising:

a storing device operable to store the recording pulse parameters;

a test writing device operable to perform a first test write to the optical disc using one prerecorded recording pulse parameter stored in said storing device;

a correction device operable to add a correction value to said one recording pulse parameter to change either one of the leading mark-edge pulse parameter and the trailing mark-edge pulse parameter to form a corrected recording pulse parameter, said test writing device being operable to perform a second test write to the optical disc using the corrected recording pulse parameter;

a jitter detector operable to reproduce the first test write and the second test write and to detect a first jitter from the reproduced first test write and a second jitter from the reproduced second test write; and a selection device operable to compare the first jitter with the second jitter;

wherein said selection device is operable to select either said one recording pulse parameter or the corrected recording pulse parameter based on the comparison of the first jitter with the second jitter; and wherein when one recording pulse parameter is selected for one mark length and space length combination and another recording pulse parameter is selected for another mark length and space length combination, an intermediate recording pulse parameter for a combination between the one and another combinations is obtained by interpolation from the one and another recording pulse parameters.

* * * * *